United States Patent [19]
Pearson et al.

[11] Patent Number: 5,495,268
[45] Date of Patent: Feb. 27, 1996

[54] DISPLAY SYSTEM FOR GCU MAINTENANCE INFORMATION

[75] Inventors: Kenneth Pearson, Rockford; Thomas Utecht, Cherry Valley, both of Ill.

[73] Assignee: Sundstrand Corporation, Rockford, Ill.

[21] Appl. No.: 139,488

[22] Filed: Oct. 20, 1993

[51] Int. Cl.⁶ .................................................. G09G 5/22
[52] U.S. Cl. ........................................ 345/192; 395/145
[58] Field of Search ................................. 345/112, 115, 345/116, 119, 141, 133, 185, 192, 189, 201; 395/164, 165, 144, 145, 146, 148, 149; 364/419.08, 419.1

[56] References Cited

U.S. PATENT DOCUMENTS

| | | | |
|---|---|---|---|
| 4,471,464 | 9/1984 | Mayer et al. | 345/133 |
| 4,513,391 | 4/1985 | Maddock | 395/146 |
| 4,843,570 | 6/1989 | Sugitani | 345/192 |
| 4,934,823 | 6/1990 | Okami | 395/164 |
| 5,146,552 | 9/1992 | Cassorla et al. | 395/145 |

OTHER PUBLICATIONS

"Component Maintenance Manual—Generator Control Unit", Apr. 1988.

*Primary Examiner*—Richard Hjerpe
*Assistant Examiner*—Chanh Nguyen
*Attorney, Agent, or Firm*—Jeffery J. Makeever

[57] ABSTRACT

A display system and method of displaying data relating to a generator control unit for an aircraft having a first memory of a first type and a second memory of a second type. The first memory contains display data relating to a generator control unit for an aircraft and a plurality of file markers interspersed among the display data, with each of the file markers occupying a respective position in the first memory. The first memory is searched to locate the positions of the file markers. Those positions are stored in the second memory, which is preferably a random-access semiconductor memory. The display data in the first memory is displayed by retrieving a portion of the display data from the first memory based upon the positions stored in the second memory.

15 Claims, 7 Drawing Sheets

DISPLAY SYSTEM FOR GCU MAINTENANCE INFORMATION

BACKGROUND OF THE INVENTION

The present invention is directed to a display system and method for displaying information, such as maintenance information relating to a generator control unit for an aircraft.

Maintenance and testing information for a generator control unit (GCU) for an aircraft has been previously provided in the form of paper manuals to allow repair technicians, service engineers and other personnel to perform maintenance procedures on an aircraft. Due to the relative complexity of such procedures, the maintenance manuals have been relatively large and bulky and inconvenient to use in a maintenance environment.

One prior art maintenance manual, referred to as a component maintenance manual ("CMM"), was approximately 300 pages in length. The CMM had a number of sections including a safety advisory section, a section containing fault isolation instructions, a section listing shop-relevant fault (SRF) messages, and a section listing acceptance test fault isolation procedures.

When testing a GCU, a service engineer would connect the GCU to an electrical test unit and perform various testing procedures via the test unit. If the GCU failed a built-in-test (BIT) testing procedure, an SRF fault message would be displayed on the testing monitor, and the service engineer would review the CMM for further information and/or test procedures regarding the SRF message. In performing an acceptance test on a GCU, the service engineer would consult the CMM section containing acceptance test fault isolation procedures for additional information and/or procedures relating to such testing.

SUMMARY OF THE INVENTION

The present invention is directed to a display system and method of displaying textual data. Where the display data relates to a generator control unit for an aircraft, the display system may replace the bulky paper manuals that were previously used.

The display system includes a first memory in which textual display data is stored and which also contains a plurality of file markers interspersed among the display data. The file markers mark the boundaries of data segments or portions within the display data. The first memory may be disk memory, such as a hard disk, CD-ROM, or a diskette.

Prior to displaying data, the first memory is searched to locate the positions of the file markers with respect to the display data, and that position data is stored in a second memory. The second memory is of a different type than said first memory, preferably comprising a random-access semiconductor memory. The data in the first memory is then displayed on a visual display device by retrieving and displaying a portion of the display data from the first memory based upon the position data stored in the second memory.

The file markers stored in the first memory may be of three different types: a line marker which marks the end of a display line, an end-of-text marker which marks the end of a portion of display data, and an end-of-segment marker which marks the end of a subportion of display data.

These and other features and advantages of the present invention will be apparent to those of ordinary skill in the art in view of the detailed description of the preferred embodiment, which is made with reference to the drawings, a brief description of which is provided below.

DETAILED DESCRIPTION OF A PREFERRED EMBODIMENT

Figure 1:
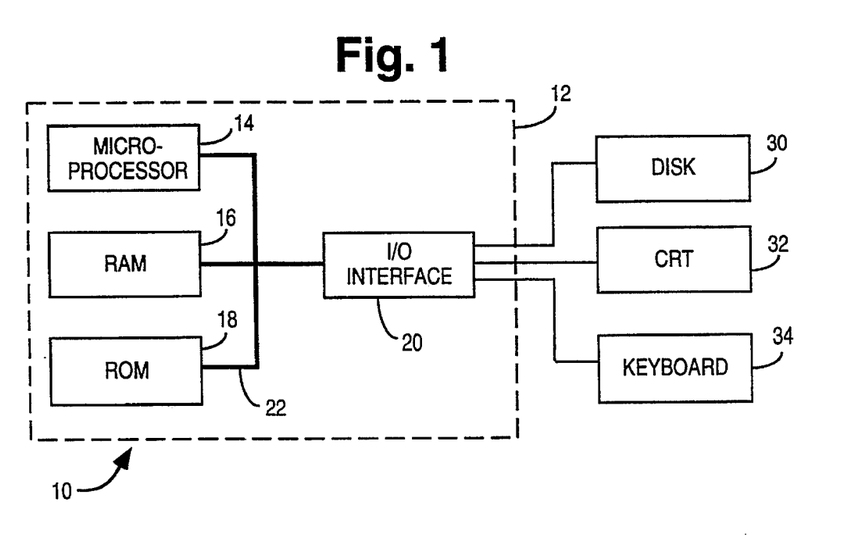
FIG. 1 is a block diagram of the electronics of one embodiment of the invention.

A preferred embodiment of a system 10 for displaying data relating to a generator control unit (GCU) for an aircraft is shown in FIGS. 1–7C. Referring to FIG. 1, the display system 10 includes a controller 12 having a microprocessor 14, a semiconductor random-access memory (RAM) 16, a read-only memory (ROM) 18, and an I/O interface 20 interconnected by an address/data bus 22.

The I/O interface 20 of the controller 12 is connected to a disk unit 30, which may be a hard disk, CD-ROM, or a diskette (and disk drive), a visual display device such as a cathode ray tube (CRT) 32, and an input device, such as a keyboard 34. The hardware components shown in FIG. 1 may be part of a conventional computer system, such as a personal computer.

The display system 10 includes a computer program, flowcharts of which are illustrated in FIGS. 3, 4, 6A and 6B. The computer program, which is stored on the disk 30, contains computer program instructions which are executed by the microprocessor 14 and display data from which visual displays of textual information relating to a GCU are generated.

Figure 2:
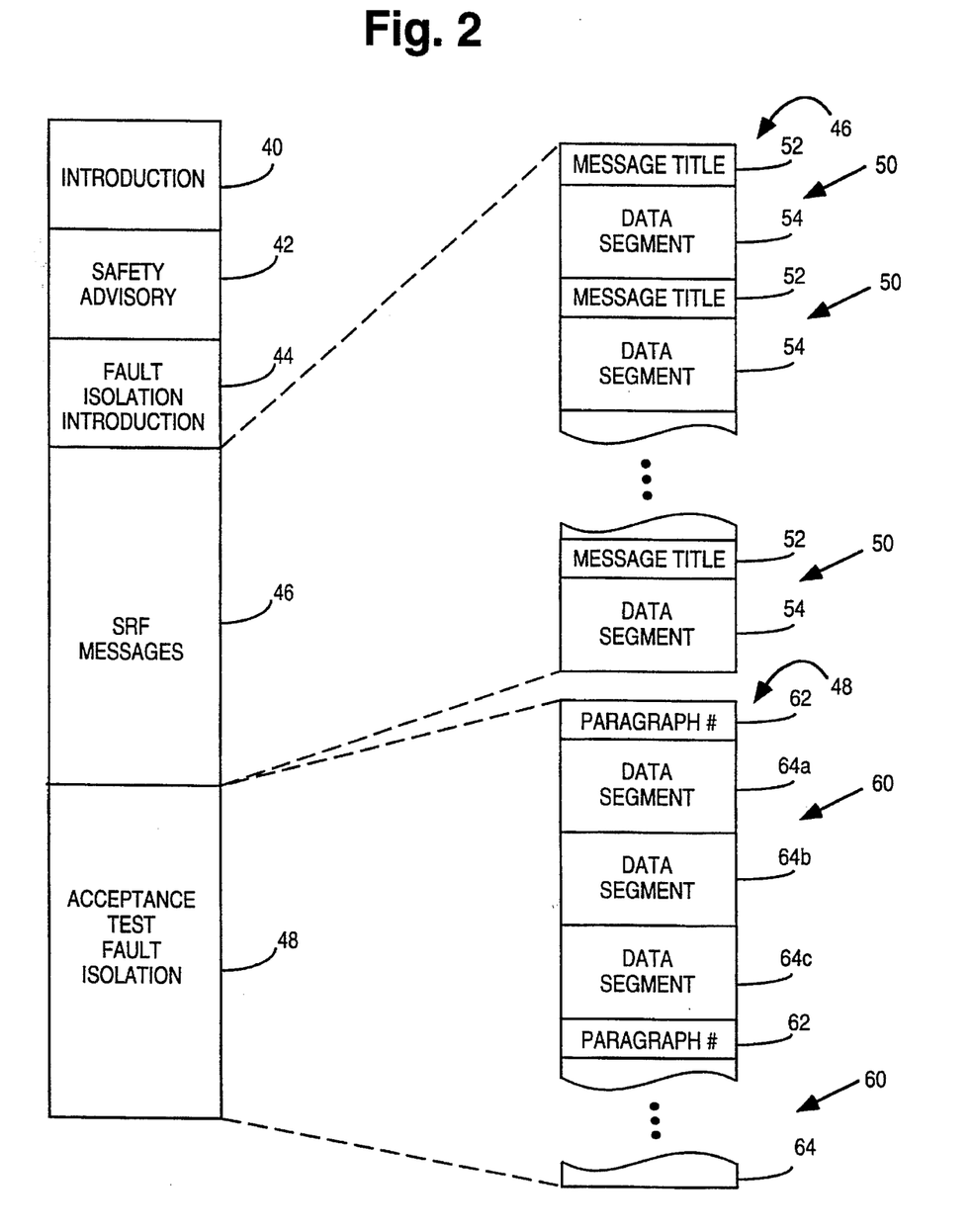
FIG. 2 is a diagram of the logical organization of a number of data files stored in memory in the preferred embodiment.

The general organization of the display data in memory (the disk 30) is schematically shown in FIG. 2. Referring to FIG. 2, the display data includes a first data file 40 from which a multi-screen introduction is displayed on the CRT 32, a second data file 42 from which a multi-screen safety advisory is displayed, and a third data file 44 from which a multi-screen fault isolation introduction is displayed. The display data also includes a fourth data file 46 from which displays relating to SRF messages are generated and a fifth data file 48 from which acceptance test fault isolation displays are generated.

Referring to the right-hand side of FIG. 2, the logical organization of the SRF messages data file 46 is shown to include a number of data records 50, each of which includes a header portion 52 containing data representing the title of an SRF message and a data portion or segment 54 containing data representing a single screen of text corresponding to the SRF message. The logical organization of the acceptance test fault isolation data file 48 is shown to include a number of data records 60, each of which includes a header portion 62 containing data representing the title of a procedure (which can be represented by, e.g., a paragraph number like those shown in FIG. 7B under "Title") and one or more data segments 64, each of which contains data representing a single screen of text corresponding to the procedure.

Figure 3:
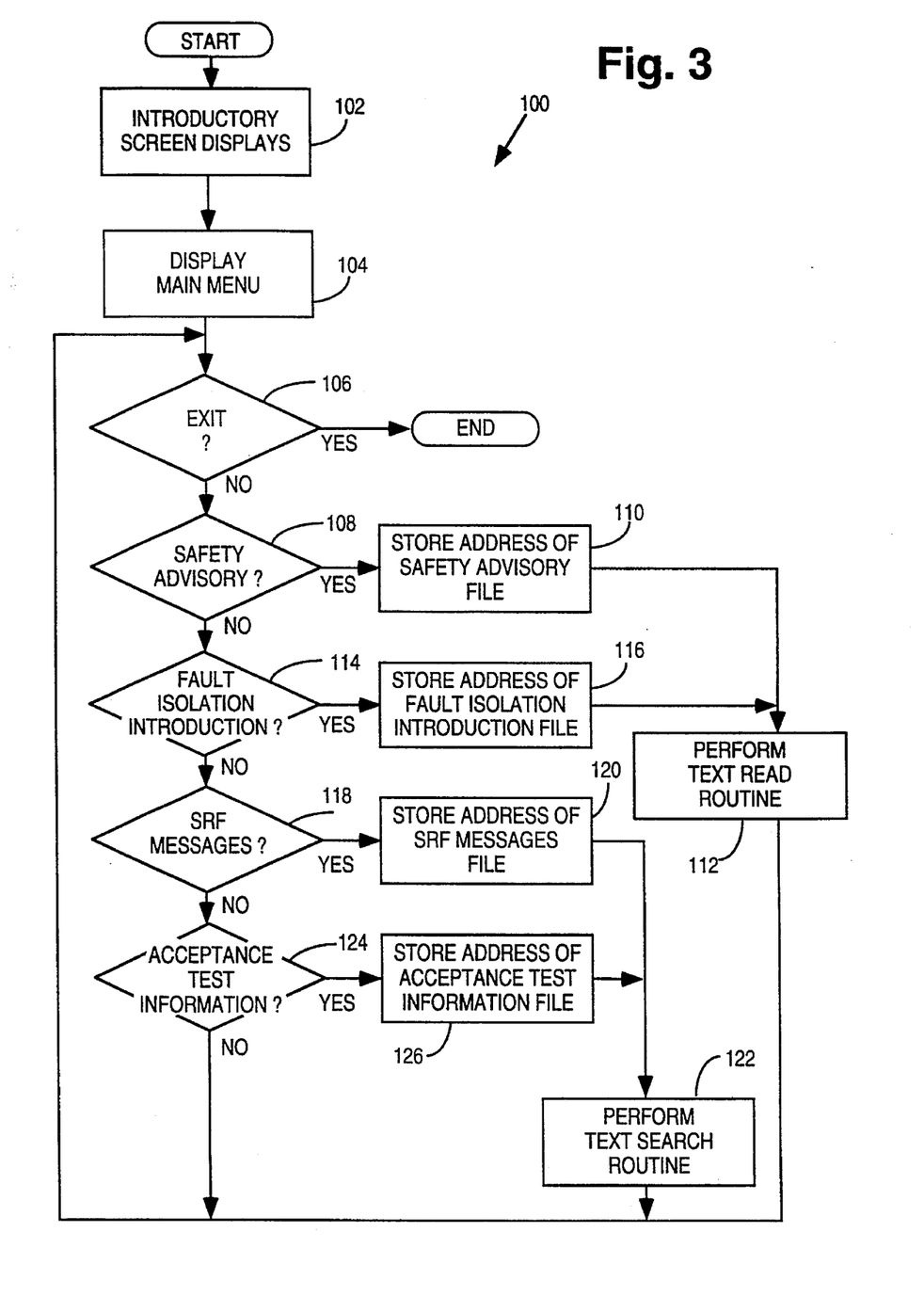
FIG. 3 is a flowchart of a computer program routine of the preferred embodiment.

A flowchart of a computer program 100 which controls the operation of the display system 10 is shown in FIGS. 3, 4, 6A, and 6B. Referring to FIG. 3, at step 102 a number of introductory screen displays are generated on the CRT 32 based on the display data stored in the introduction data file 40. Each screen is displayed until the user of the system hits any key of the keyboard 34, at which point the next introductory screen is displayed. After the last introductory screen has been displayed, a main menu screen is displayed at step 104.

The main menu screen provides five options which the user may select. A first option is to exit the program. If this option is selected by the user (by depressing the Escape key of the keyboard 34) as determined at step 106, the program ends.

A second option is to review the safety advisory. If this option is chosen by the user as determined at step 108, the program branches to step 110, where the address of the safety advisory data file 42 in memory is stored. The program then branches to step 112 where a text read routine is performed on the safety advisory data file 42, as specified by the address of that file stored at step 110, to control how the multi-screen displays of that file 42 are generated. The text read routine is described in more detail below.

A third option available to the user is to review the fault isolation introduction. If this option is chosen as determined at step 114, the program branches to step 116, where the address of the fault isolation introduction data file 44 in memory is stored. The program then branches to step 112 where the text read routine is performed on the fault isolation introduction data file 44, as specified by the address of that file 44 stored at step 116, to control how the multi-screen displays of that file 44 are generated.

A fourth option available to the user is to review data relating to one or more SRF messages contained in the SRF messages data file 46. If this option is chosen as determined at step 118, the program branches to step 120, where the address of the SRF messages data file 46 in memory is stored. The program then branches to step 122 where a text search routine is performed on the SRF messages data file 46, as specified by the address of that file 46 stored at step 120, to control how the fault isolation data relating to the SRF messages are generated.

The final option available to the user is to review one or more sections of the acceptance test fault isolation data file 48. If this option is chosen as determined at step 124, the program branches to step 126, where the address of the data file 48 in memory is stored. The program then branches to step 122 where the text search routine is performed on the data file 48, as specified by the address of that file stored at step 126, to control how the acceptance test fault isolation data is displayed.

Figure 4:
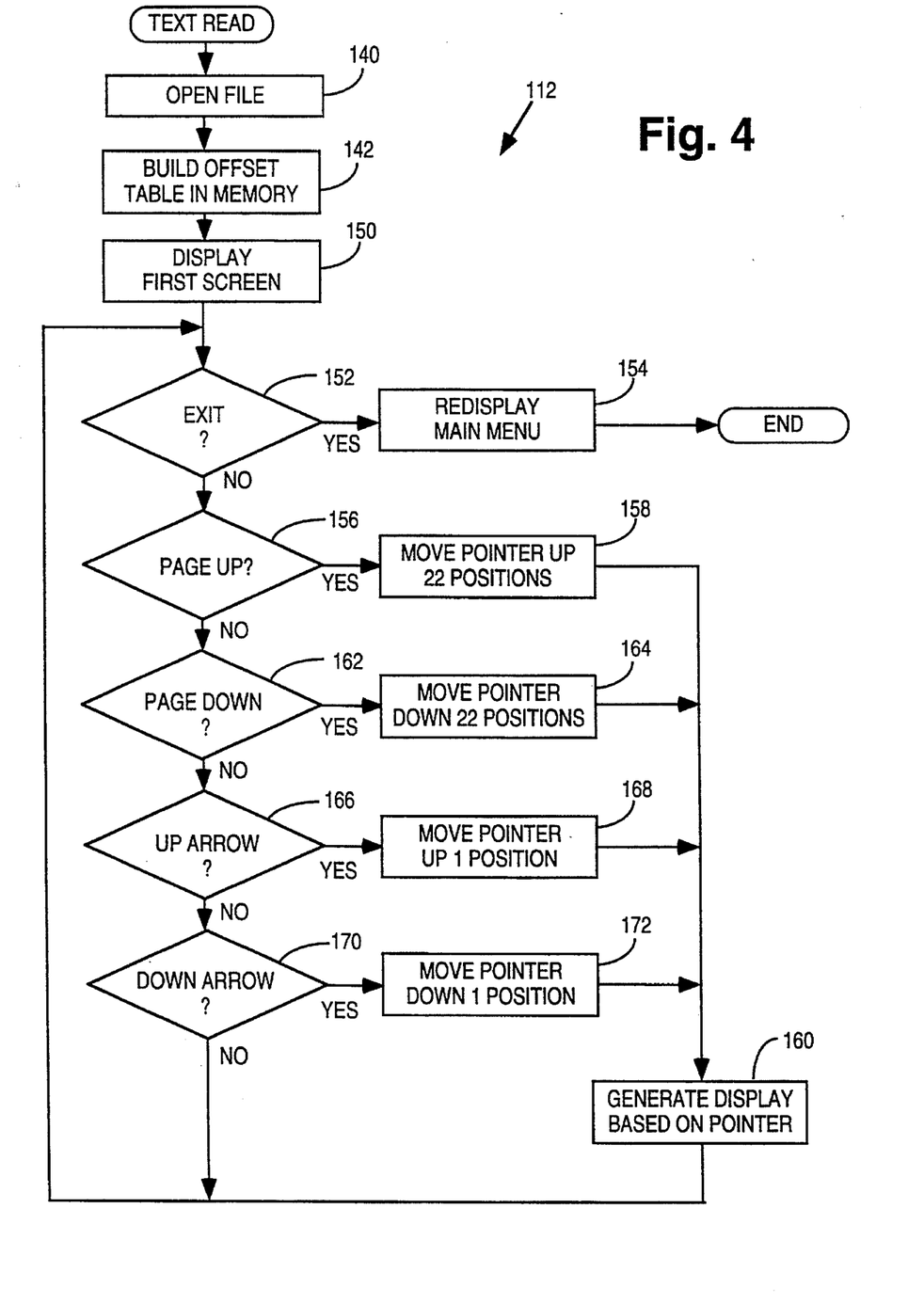
FIG. 4 is a flowchart of the text read routine shown schematically in FIG. 3.

FIG. 4 is a flowchart of the text read routine shown schematically in FIG. 3 as step 112, which displays, one screen at a time, selected portions of either the multi-screen safety advisory data file 42 or the multi-screen fault isolation introduction data file 44.

Referring to FIG. 4, at step 140, either the safety advisory data file 42 or the fault isolation introduction data file 44 is opened, depending on the data file address that was stored at step 110 or 116. In unusual circumstances, the selected data file may not be opened, in which case a suitable error message is generated and the text read routine 112 terminates.

Figure 5A:
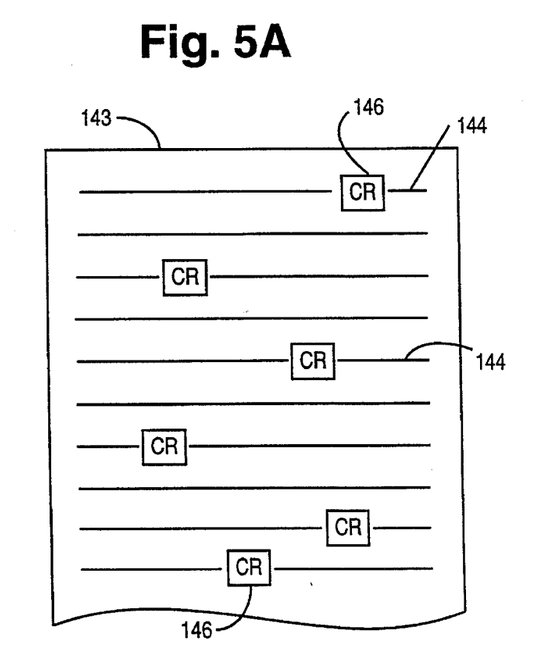
FIG. 5A is a diagram of a first type of data file as it is stored in memory.

At step 142, a memory table is built by storing in the semiconductor RAM 16 certain position or offset data derived from the data file opened at step 140. Referring to FIG. 5A, the specific manner in which the safety advisory data file 42 and the fault isolation introduction data file 44 are stored in memory (disk memory) is shown by a data file 143. The data file 143 consists of a large number of data bytes, each of which represents a separate letter or symbol. The data bytes are represented in FIG. 5A by horizontal lines 144. File markers, or line markers, 146 are interspersed among the data bytes in positions which separate the data bytes into display lines which will be displayed on the CRT 32, with each string of data bytes to be displayed on a single display line terminating in a line marker 146. The line markers 146 may be ASCII carriage returns (CR).

Figure 5B:
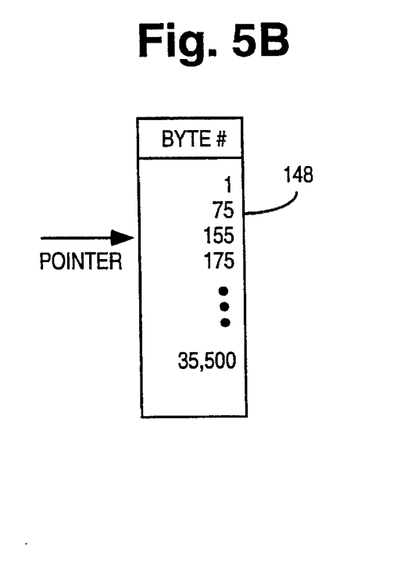
FIG. 5B illustrates a memory table associated with the first type of data file.

The memory table that is built and stored in the RAM 16 at step 142 is illustrated in FIG. 5B as memory table 148. Each entry in the table 148 contains the number of the data byte which will be displayed at the beginning of each display line of the CRT 32. For example, the first display line in the data file 143 would begin with data byte #1; the second display line would begin with data byte #75; and so forth. The memory table 148 is built by numbering or counting the data bytes from the start of the data file 143 and storing in each entry of the table 148 the number of the data byte following each line marker 146. As described below, a pointer (shown in FIG. 5B as an arrow) is used to specify or address the first or top line of data that is currently being displayed on the CRT 32.

Referring back to FIG. 4, at step 150, the first screen of data in the data file opened at step 140 is displayed. That is accomplished by reading and displaying the contents of the data file 143, starting with the beginning of the data file and ending when a predetermined line marker 146 is detected. Since a CRT screen is typically capable of displaying 22 lines of data, the display data would typically be read from the data file 143 and displayed on the CRT 32 until the twenty-second line marker 146 was detected.

Several user options are also displayed with the first screen of data. Such options include exiting the text read routine 112, displaying the next screen or page of data on the CRT 32, displaying the previous page of data (if not currently displaying the first page), and scrolling he page of data up or down by one display line.

At step 152, if the exit option is selected, the program branches to step 154, where the main menu is redisplayed, and the text read routine 112 ends, and the program continues execution at step 106 of FIG. 3.

At step 156, if the page-up option is selected, the program branches to step 158, where the pointer of the memory table 148 (FIG. 5B) is moved up 22 positions (assuming the CRT 32 can display 22 lines of text on a single screen).

At step 160, the data byte number in the memory table 148 currently specified by the pointer is read, and the next screen of data is displayed based on that data byte number. In particular, the screen is generated by reading and displaying on the CRT 32 the contents of the data file 143, beginning with the data byte currently specified by the pointer and ending when the twenty-second line marker 146 following the data byte specified by the pointer is detected.

At step 162, if the page-down option was selected, the program branches to step 164, where the pointer is moved down 22 positions in the memory table 148 so that the next page in the data file 143 will be displayed at step 160.

At step 166, if the up-arrow option was selected, the program branches to step 168, where the pointer is moved up one position in the memory table 148 so that at step 160 the screen currently being displayed will be shifted down by one display line.

At step 170, if the down-arrow option was selected, the program branches to step 172, where the pointer is moved down one position in the memory table 148 so that at step 160 the screen currently being displayed will be shifted up by one display line.

If the program reaches step 170 and the user input was not the down-arrow option, the program simply branches back to step 152 since the program only responds to the five options of steps 152–170 and ignores other user input.

Figure 6A:
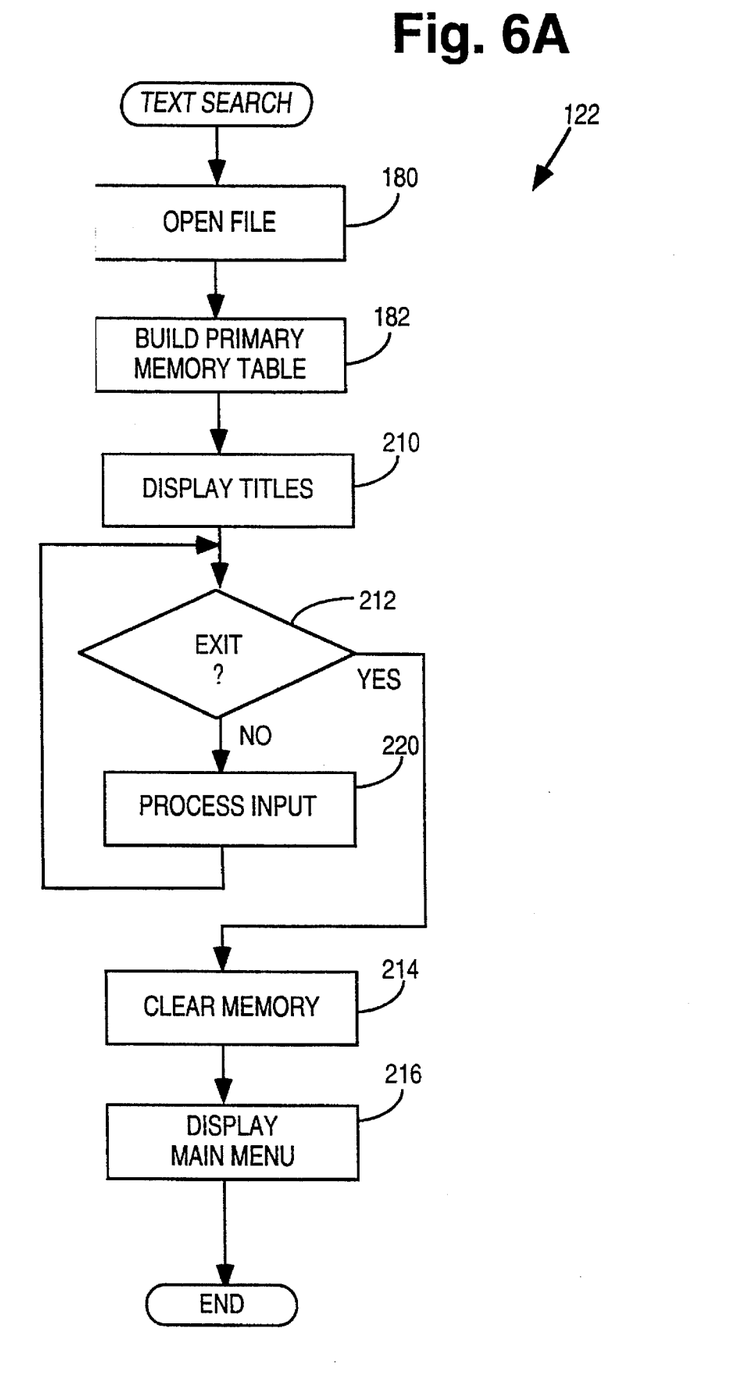
FIGS. 6A and 6B are flowcharts of the text search routine shown schematically in FIG. 3.

FIG. 6A is a flowchart of the text search routine shown schematically in FIG. 3 as step 122, which selectively displays, one screen at a time, portions of either the SRF message data file 46 or the acceptance test information data file 48.

Referring to FIG. 6A, at step 180, either the SRF messages data file 46 or the acceptance test information data file 48 is opened, depending on the data file address that was stored at step 120 or 126. In unusual circumstances, the selected data file may not be opened, in which case a suitable error message is generated and the text search routine 122 terminates.

At step 182, a primary memory table is built by storing in the semiconductor RAM 16 certain position or offset data derived from the data file opened at step 180.

Figure 7A:
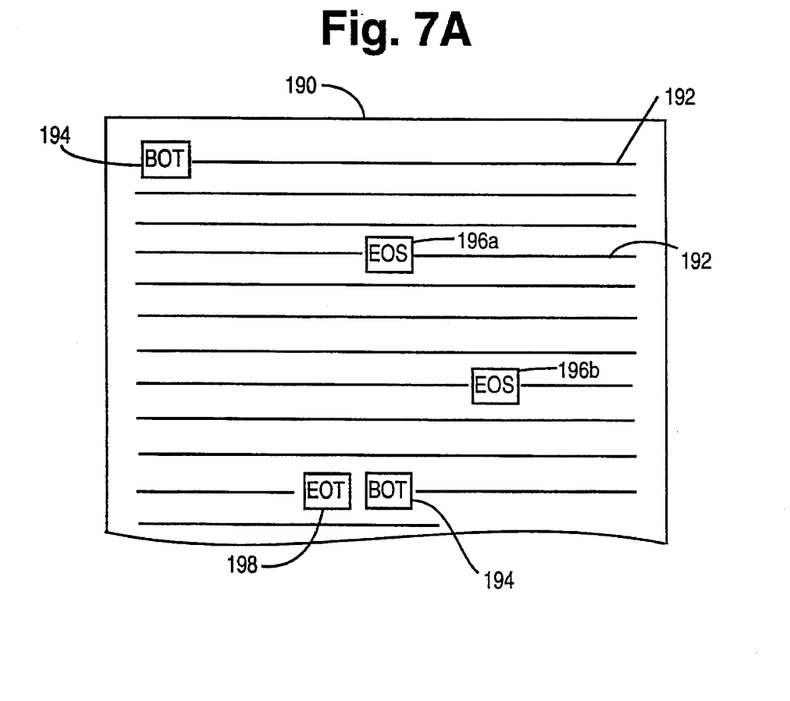
FIG. 7A is a diagram of a second type of data file as it is stored in memory.

Referring to FIG. 7A, the specific manner in which the SRF messages data file 46 and the acceptance test information data file 48 are stored in memory (the disk 30) is shown by a data file 190. The data file 190 consists of a large number of data bytes, each of which represents a separate letter or symbol. The data bytes are represented in FIG. 7A by horizontal lines 192. Line markers (not shown) are interspersed among the data bytes in positions which separate the data bytes into display lines which will be displayed on the CRT 32.

The data file 190 includes several types of file markers which divide the text represented by the data bytes into a number of portions and subportions. The file markers include a number of beginning-of-text (BOT) markers 194, a number of end-of-segment (EOS) markers 196, and a number of end-of-text (EOT) markers 198.

The BOT markers 194 are used to indicate the beginning of a portion of text, and the EOT markers 198 are used to indicated the end of that portion of text. The EOS markers 196 are used to subdivide the portion of text between a BOT marker 194 and and EOT marker 198 into subportions. The ASCII character "@" could be used as the BOT marker 194; the ASCII character "$" could be used as the EOS marker 196; and the ASCII character "#" could be used as the EOT marker 198. The specific type of markers used is not important to the invention.

Referring to FIG. 2, the acceptance test fault isolation data file 48 is shown to have a data record 60 with a header 62 containing the title of the data record 60 followed by three data segments 64a, 64b, 64c. As it is stored in memory (FIG. 7A), the header 62 of a data record 60 is provided immediately after a BOT marker 194; the data segment 64a is followed by the EOS marker 196a; the data segment 64b is followed by the EOS marker 196b; and the data segment 64c is followed by an EOT marker 198. Thus, referring to FIGS. 2 and 7A, the text portion between the BOT marker 194 and the EOS marker 196a in FIG. 7A corresponds to the data segment 64a of FIG. 2; the text portion between the EOS marker 196a and the EOS marker 196b in FIG. 7A corresponds to the data segment 64b of FIG. 2; and the text portion between the EOS marker 196b and the EOT marker 198 in FIG. 7A corresponds to the data segment 64c of FIG. 2.

Figure 7B:
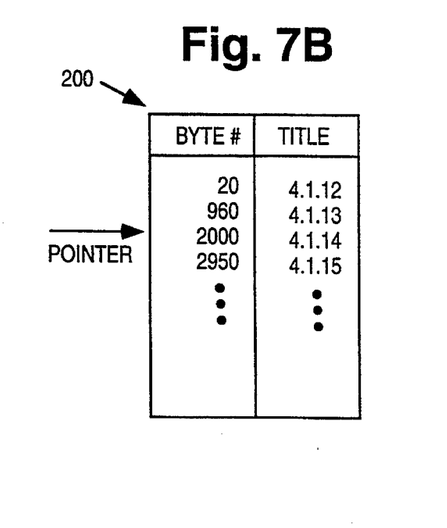
FIG. 7B illustrates a primary memory table associated with the second type of data file.

The primary memory table that is built and stored in the RAM 16 at step 182 is illustrated in FIG. 7B as memory table 200. The table 200 includes a line for each of the data records in the data file opened at step 180. Each line in the table 200 contains two entries: 1) the title of the data record, and 2) number of the data byte immediately following the title of the data record.

For example, referring to FIGS. 7A and 7B, the first line in the primary memory table 200 contains data representing the title of the first data record and byte #20, which is the number of the data byte immediately following the title. The second line in the table 200 contains data representing the title of the second data record and byte #960, the number of the data byte immediately following that title. The number of lines in the primary memory table 200 corresponds to the number of data records in the data file opened at step 180.

The memory table 200 is built by scanning the entire data file 190 and searching for the BOT markers 194. When each BOT marker 194 is located, the data bytes following that marker representing the title of the data record are retrieved and stored in the table 200 and the number of the first data byte following the title is stored in the same line of the table 200. A fixed number of data bytes could be used to represent each title. Alternatively, the number of data bytes in the title could be variable and an end-of-title file marker could be used to identify the end of the title. The EOS markers 196 in the data file 190 are ignored for purposes of building the primary memory table 200.

Referring back to FIG. 6A, after the primary memory table 200 is built at step 182, the program proceeds to step 210, where the titles of all of the data records of the data file opened at step 180 are displayed on the CRT 32. If the titles are so numerous that they cannot be displayed on a single screen, the first screen of titles could be displayed and the user could be allowed to scroll the screen up or down to view the remaining titles.

Once the titles have been displayed for the user, at step 212, the user has a number of options, one of which is to exit the text search routine 122, in which case the program branches to step 214 where the memory portion containing the primary memory table 200 is cleared, then to step 216 where the main menu is redisplayed, and then back to step 106 (FIG. 3). At step 212, if the user selected an option other than to exit, the program branches to step 220, where the user's input is processed.

Figure 6B:
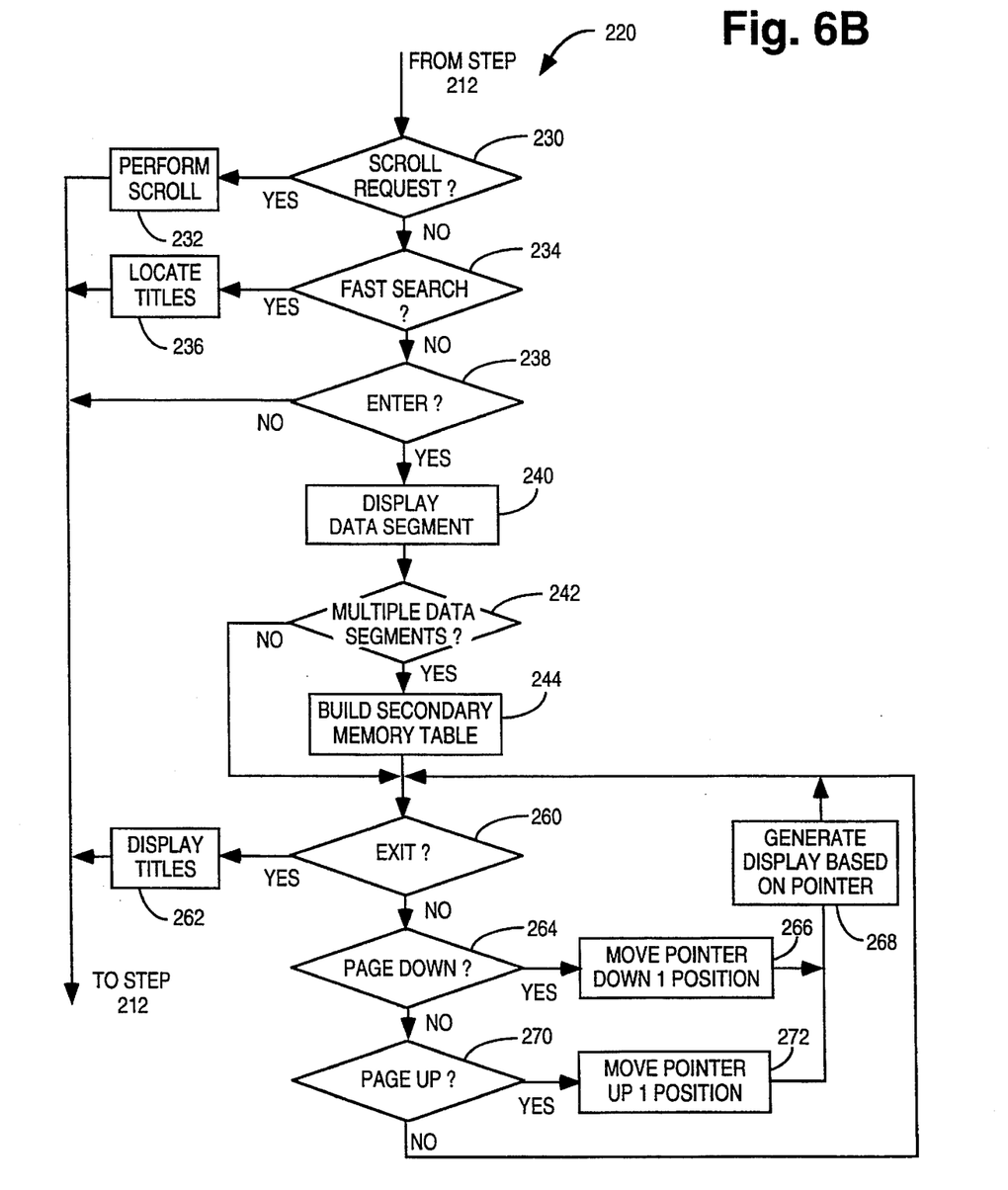

The process-input step 220 shown schematically in FIG. 6A is shown in detail in FIG. 6B. Referring to FIG. 6B, if the selected user option was a scroll request as determined at step 230, the program branches to step 232 where the display on the CRT 32 is scrolled either up or down.

The user may retrieve textual information for any of the data record titles displayed on the CRT 32. This may be performed by scrolling a highlight bar (not shown), which highlights one title at a time, and pressing the Enter key to obtain the textual information associated with the currently highlighted title. Alternatively, the program may have a "fast search" option pursuant to which the user may simply type the name of a title to automatically move the highlight bar to that title without the need for scrolling.

At step 234, if the user utilized the fast search option by typing in a title, the program branches to step 232 where the title is located by moving the highlight bar to that title.

At step 238, if the user depressed the Enter key (to select a title), the first data segment associated with the title currently highlighted by the highlight bar is displayed on the CRT 32. This data segment is either one of the data segments 54 of the SRF messages file 46 or one of the data segments 64 of the acceptance test fault isolation file 48. If at step 238 the user input was not the Enter key, the program simply branches back to step 212 since the program only responds to the four options of steps 212, 230, 234, 238 and ignores other user input.

The data segment is displayed on the CRT 32 with the use of a pointer, shown as an arrow in FIG. 7B, which points to a line in the primary memory table 200. Each time the highlight bar moves to a different title, the pointer is moved to the line in the memory table 200 containing that highlighted title. To display the data segment at step 240, the contents of the data file 190 (FIG. 7A) are read and displayed on the CRT 32, beginning from the data byte number in the primary memory table 200 specified by the pointer, until either an EOS marker 196 or an EOT marker 198 is detected, at which point no more data is displayed.

If an EOS marker 196 is detected prior to an EOT marker 198 when the contents of the data file 190 are read, then there are multiple data segments, such as segments 64a, 64b, 64c, in that data record. At step 242, if there are multiple data segments, the program branches to step 244 where a secondary memory table is built and stored in the RAM 16.

Figure 7C:
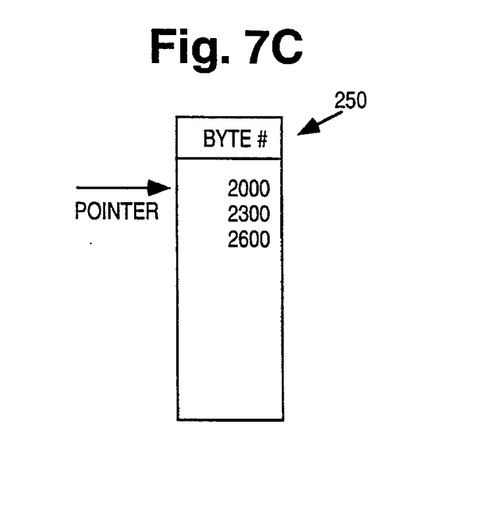
FIG. 7C illustrates a secondary memory table associated with the second type of data file.

Referring to FIG. 7C, the secondary memory table is shown as table 250. The first entry in the secondary memory table 250 contains the number of the first data byte (following the title) in the first of the multiple data segments. This byte number is the same as the byte number in the corresponding entry in the primary memory table 200, i.e., byte #2000. Each entry in the secondary memory table 250 after the first entry contains the number of the data byte which immediately follows a respective EOS marker 196. The number of entries in the secondary table 250 thus corresponds with the number of data segments available in the data record.

While a data segment of a data record is being displayed, the user has a number of options, depending on whether the data record has only one data segment or multiple data segments. If the data record has only one data segment (in which case it is currently being displayed), the only option available to the user is to exit. At step 260, if the user decides to exit, the 10 program branches to step 262, which like step 210, causes the titles of all of the data records to be displayed.

If there are multiple data segments in the data record, the user's other options include a page-up option to view a previous data segment and a page-down option to view the next data segment.

If the user selects the page-down option as determined at step 264, the program branches to step 266, where the position of a pointer to the secondary memory table (shown as an arrow in FIG. 7C) is moved down one position to point to or specify the number of the first data byte in the next data segment.

At step 268, the display is generated by reading and displaying on the CRT 32 all data bytes in the data file opened at step 180, beginning with the byte number specified by the pointer to the secondary memory table 250 and ending when an EOS marker 196 or an EOT marker 198 is detected. The data file may be designed so that the textual data between adjacent file markers 194, 196, 198 fits on a single display screen.

At step 270, if the page-up option was selected, the program branches to step 272 where the pointer to the secondary memory table 250 is moved up one position so that it points to the number of the first data byte in the previous screen display. The program then proceeds to step 268, where the previous display screen is generated based on the pointer.

Modifications and alternative embodiments of the invention will be apparent to those skilled in the art in view of the foregoing description. This description is to be construed as illustrative only, and is for the purpose of teaching those skilled in the art the best mode of carrying out the invention. The details of the structure and method may be varied substantially without departing from the spirit of the invention, and the exclusive use of all modifications which come within the scope of the appended claims is reserved.

What is claimed is:

1. A method of displaying data comprising the steps of:

searching a portion of a first memory containing display data and a plurality of file markers of first, second, third and fourth types interspersed among said display data at a plurality of positions to locate a plurality of said positions of a plurality of said file markers, said first type file marker indicating a beginning of a portion of said display data, said second type file marker indicating an end of a line of display data, said third type file marker indicating an end of a subportion of said display data, and said fourth type file marker indicating an end of the portion of said display data;

storing position data relating to said plurality of said positions of said plurality of said file markers in a second memory, said second memory being of a different type than said first memory, said second memory comprising a random-access semiconductor memory, said storing position data step comprising; generating a first memory table containing position data related to said first type file markers, and generating a second memory table containing position data related to said third type file markers;

retrieving a subportion of said display data from said first memory based upon said position data stored in said storing step; and displaying said subportion of display data retrieved in said retrieving step on a visual display.

2. A method as defined in claim 1 wherein said first memory comprises a hard disk.

3. A method as defined in claim 1 wherein said first memory comprises a diskette.

4. A method as defined in claim 1 wherein each of said subportions of said display data comprises a plurality of lines of said display data.

5. A method as defined in claim 1 wherein said position data represents a plurality of position numbers, each of said position numbers representing the number of a data byte stored in said first memory.

6. A method as defined in claim 5 wherein said display data is organized into a plurality of display lines and wherein each of said position numbers comprises the byte number of the first data byte in each of said display lines of said display data.

7. A method as defined in claim 1 wherein said step of retrieving a portion of said display data from said first memory comprises the step of:

retrieving a portion of said display data stored after a data position specified by a data pointer.

8. A method as defined in claim 1 wherein said display data comprises data relating to a generator control unit.

9. A display system for displaying data comprising:

a first memory containing display data and a plurality of file markers of first, second, third and fourth types interspersed among said display data, each of said file markers occupying a respective position in said first memory, said first type file marker indicating a beginning of a portion of said display data, said second type file marker indicating an end of a line of display data, said third type file marker indicating an end of a subportion of said display data, and said fourth type file marker indicating an end of the portion of said display data;

means for searching said first memory to locate a plurality of said positions of a plurality of said file markers in said first memory;

a second memory of a different type than said first memory and comprising a random-access semiconductor memory;

means for storing position data relating to said plurality of said positions of said plurality of said file markers in said second memory, said position data storing means generating a first memory table containing position data related to said first type file markers and generating a second memory table containing position data related to said third type file markers;

means for retrieving a subportion of said display data from said first memory based upon said position data; and means for displaying said subportion of display data retrieved by said retrieving means on a visual display.

10. A system as defined in claim 9 wherein said first memory comprises a hard disk.

11. A system as defined in claim 9 wherein said first memory comprises a diskette.

12. A system as defined in claim 9 wherein each of said subportions of said display data comprises a plurality of lines of said display data.

13. A system as defined in claim 10 wherein said position data represents a plurality of position numbers, each of said position numbers representing the number of a data byte in said first memory.

14. A system as defined in claim 13 wherein said display data is organized into a plurality of display lines and wherein each of said position numbers comprises the byte number of the first data byte in each of said display lines of said display data.

15. A method as defined in claim 9 wherein said display data comprises data relating to a generator control unit.

* * * * *